United States Patent
He et al.

(10) Patent No.: US 9,985,963 B2
(45) Date of Patent: May 29, 2018

(54) METHOD AND SYSTEM FOR AUTHENTICATING LIVENESS FACE, AND COMPUTER PROGRAM PRODUCT THEREOF

(71) Applicants: BEIJING KUANGSHI TECHNOLOGY CO., LTD., Beijing (CN); PINHOLE (BEIJING) TECHNOLOGY CO., LTD., Beijing (CN)

(72) Inventors: Tao He, Beijing (CN); Kai Jia, Beijing (CN); Zhimin Cao, Beijing (CN)

(73) Assignees: BEIJING KUANGSHI TECHNOLOGY CO., LTD., Beijing (CN); PINHOLE (BEIJING) TECHNOLOGY CO., LTD., Beijing (CN)

( * ) Notice: Subject to any disclaimer, the term of this patent is extended or adjusted under 35 U.S.C. 154(b) by 74 days.

(21) Appl. No.: 14/888,621

(22) PCT Filed: Feb. 15, 2015

(86) PCT No.: PCT/CN2015/073120
§ 371 (c)(1),
(2) Date: Nov. 2, 2015

(87) PCT Pub. No.: WO2016/127437
PCT Pub. Date: Aug. 18, 2016

(65) Prior Publication Data
US 2016/0373437 A1    Dec. 22, 2016

(51) Int. Cl.
*H04L 29/06* (2006.01)
*G06F 21/32* (2013.01)
*G06K 9/00* (2006.01)

(52) U.S. Cl.
CPC .......... *H04L 63/0861* (2013.01); *G06F 21/32* (2013.01); *G06K 9/00221* (2013.01);
(Continued)

(58) Field of Classification Search
CPC ..... H04L 63/0861; G06F 21/31; G06F 21/32; G06K 9/00221; G06K 9/00255;
(Continued)

(56) References Cited

U.S. PATENT DOCUMENTS 6,128,398 A * 10/2000 Kuperstein ........ G07C 9/00079
382/116
7,634,662 B2 * 12/2009 Monroe ............. G06K 9/00221
382/117

(Continued)

FOREIGN PATENT DOCUMENTS

| CN | 102646190 | 8/2012 |
| CN | 103440479 | 12/2013 |

(Continued)

OTHER PUBLICATIONS

Wang Xianji; Chen, Youbin; Method and system for detecting living body human face. CN 103440479(translation); published Dec. 11, 2013.*

(Continued)

*Primary Examiner* — Hosuk Song
(74) *Attorney, Agent, or Firm* — Hamre, Schumann, Mueller & Larson, P.C.

(57) ABSTRACT

Disclosed are a method and a system for authenticating liveness face, and a computer program product thereof, which belong to a field of face recognition technique. The method for authenticating liveness face comprises: generating a sequence of action instructions randomly; and determining a success of the authentication of the liveness face when face actions are determined to be matched with the (Continued)

S110 — generating a sequence of action instructions randomly

S120 — determining success of authentication of the liveness face when face actions are determined to be matched with the sequence of action instructions sequentially sequence of action instructions sequentially. The authentication of the liveness face can be performed based on fine head actions, so that a cost for authenticating the liveness face is decreased, an accuracy of authentication of the liveness face is increased.

20 Claims, 6 Drawing Sheets

(52) U.S. Cl.
CPC ..... *G06K 9/00255* (2013.01); *G06K 9/00281* (2013.01); *G06K 9/00288* (2013.01); *G06K 9/00335* (2013.01); *G06K 9/00906* (2013.01)

(58) Field of Classification Search
CPC ........... G06K 9/00281; G06K 9/00288; G06K 9/00335; G06K 9/00906
USPC ..... 726/2–7, 16–19; 713/182, 186; 382/115, 382/117, 118
See application file for complete search history.

(56) References Cited

U.S. PATENT DOCUMENTS

| | | | | |
|---|---|---|---|---|
| 7,973,848 B2* | 7/2011 | Koh | ................... | G06K 9/00221 348/333.02 |
| 9,025,830 B2* | 5/2015 | Ma | ..................... | G06K 9/00221 382/107 |
| 9,082,235 B2* | 7/2015 | Lau | .......................... | G07C 9/00 |
| 9,251,401 B1* | 2/2016 | Koo | ................... | G06K 9/00288 |
| 2015/0000729 A1 | 1/2015 | Yang et al. | | |

FOREIGN PATENT DOCUMENTS

| | | | |
|---|---|---|---|
| CN | 103778360 | * | 5/2014 |
| CN | 104143078 | | 11/2014 |
| WO | 2014184436 | | 11/2014 |

OTHER PUBLICATIONS

International Search Report and Written Opinion issued in the corresponding International application No. PCT/CN2015/073120, dated Oct. 21, 2015, 18 pages.
Chinese Office Action, issued in the corresponding Chinese patent application No. 201580000346.4, dated Dec. 23, 2016, 9 pages.
Chinese Office Action issued in the corresponding Chinese patent application No. 201580000346.4, dated Aug. 29, 2016, 10 pages.
Chinese Office Action, issued in the corresponding Chinese patent application No. 201580000346.4, dated Apr. 24, 2017, 11 pages.
Chinese Office Action, issued in the corresponding Chinese patent application No. 201580000346.4, dated Jul. 11, 2017, 11 pages.

* cited by examiner

US 9,985,963 B2

METHOD AND SYSTEM FOR AUTHENTICATING LIVENESS FACE, AND COMPUTER PROGRAM PRODUCT THEREOF

TECHNICAL FIELD

The present disclosure relates to a field of face recognition technique, and particularly to a method and a system for authenticating liveness face, and a computer program product thereof.

BACKGROUND

Recently, a face recognition system is applied to a scene where an identity authentication is required, such as a security field, a financial field and the like, more and more, for example, in order to open a bank account remotely, enter an entrance guard system, authenticate transactions and operations remotely, etc. In these application fields with a high security level, an object to be authenticated should be authenticated as a legal liveness at first, besides ensuring a degree of similarity for the face of the object to be authenticated and a base stored in a database. That is to say, the face recognition system is required to resist attacks made by any attackers by means of photos, videos, 3D face models or masks.

There is no well-accepted and mature solutions for a liveness authentication in the current technical products in the market, and the exiting solutions have to be dependent on specified hardware device (such as an infrared camera or a depth camera), or only can resist the simple attacks made by means of still photos.

Therefore, there is a need for a face recognition manner which is not only independent of the specified hardware device but also can resist the attacks made by the attackers by means of various manners, such as photos, videos, 3D face models or masks.

SUMMARY

The present disclosure is proposed in view of the problem described above. In embodiments of the present disclosure, there is provided a method and a system for authenticating liveness face, and a computer program product thereof, which are capable of authenticating the liveness face based on fine head action(s), so that a cost for authenticating the liveness face is decreased, an accuracy of authentication of the liveness face is increased, and accordingly a security of an application scene where the authentication of the liveness face is applied is improved.

According to an aspect of the embodiments of the present disclosure, there is provided a method for authenticating liveness face, comprising: generating a sequence of action instructions randomly; and determining a success of the authentication of the liveness face when face actions are determined to be matched with the sequence of action instructions sequentially.

As an example, the method for authenticating liveness face according to the embodiments of the present disclosure further comprises: issuing an action instruction which has a highest order currently among all un-issued action instructions in the sequence of action instructions, according to orders of action instructions in the sequence of action instructions.

As an example, the method for authenticating liveness face according to the embodiments of the present disclosure further comprises: with respect to each of the action instructions, determining a failure of the authentication for the liveness face when a face action is determined to be not matched with the action instruction; with respect to each of the action instructions except for the one which has a lowest order in the sequence of action instructions, issuing a next action instruction only when a face action is determined to be matched with the action instruction and there is the next action instruction to be issued; and with respect to the action instruction which has a lowest order in the sequence of action instructions, determining the success of the authentication of the liveness face when a face action is determined to be matched with the action instruction.

As an example, the method for authenticating liveness face according to the embodiments of the present disclosure further comprises: with respect to each of the action instructions, determining a failure of the authentication of the liveness face when no face action is detected within a time period after the action instruction is issued or when a face action is determined to be not matched with the action instruction; with respect to each of the action instructions except for the one which has a lowest order in the sequence of action instructions, issuing a next action instruction only when a face action is detected within the time period after the action instruction is issued and is determined to be matched with the action instruction, while there is the next action instruction to be issued; and with respect to the action instruction which has the lowest order in the sequence of action instructions, determining the success of the authentication of the liveness face when a face action detected within the time period after the action instruction is issued is determined to be matched with the action instruction.

As an example, the method for authenticating liveness face according to the embodiments of the present disclosure further comprises: acquiring face images; calculating a face attribute in the face images; and recognizing the face action according to the calculated face attribute, wherein the face attribute comprises at least one of positions of face key points, face action coefficients and face gesture coefficients.

According to another aspect of the embodiments of the present disclosure, there is provided a system for authenticating liveness face, comprising: one or more processors; one or more storages; computer program instructions stored in at least one of the storages, as executed by at least one of the processors, the computer program instructions performing steps of: generating a sequence of action instructions randomly; and determining a success of authentication of a liveness face when face actions are determined to be matched with the sequence of action instructions sequentially.

According to a further aspect of the embodiments of the present disclosure, there is provided a computer program product comprising a computer-readable storage medium on which computer program instructions are stored, as executed by a computer, the computer program instructions performing steps of: generating a sequence of action instructions randomly; and determining a success of authentication of a liveness face when face actions are determined to be matched with the sequence of action instructions sequentially.

As an example, as executed by the computer or at least one of the processors, the computer program instructions further performs steps of: issuing an action instruction which has a highest order currently among all un-issued action instructions in the sequence of action instructions, according to orders of action instructions in the sequence of action instructions; with respect to each of the action instructions, determining a failure of the authentication for the liveness face when a face action is determined to be not matched with the action instruction; with respect to each of the action instructions except for the one which has a lowest order in the sequence of action instructions, issuing a next action instruction only when a face action is determined to be matched with the action instruction and there is the next action instruction to be issued; and with respect to the action instruction which has a lowest order in the sequence of action instructions, determining the success of the authentication of the liveness face when a face action is determined to be matched with the action instruction.

As an example, as executed by the computer or at least one of the processors, the computer program instructions further performs steps of: issuing an action instruction which has a highest order currently among all un-issued action instructions in the sequence of action instructions, according to orders of action instructions in the sequence of action instructions; with respect to each of the action instructions, determining a failure of the authentication of the liveness face when no face action is detected within a time period after the action instruction is issued or when a face action is determined to be not matched with the action instruction; with respect to each of the action instructions except for the one which has a lowest order in the sequence of action instructions, issuing a next action instruction only when a face action is detected within the time period after the action instruction is issued and is determined to be matched with the action instruction, while there is the next action instruction to be issued; and with respect to the action instruction which has a lowest order in the sequence of action instructions, determining the success of the authentication of the liveness face when a face action detected within the time period after the action instruction is issued is determined to be matched with the action instruction.

As an example, the system for authenticating liveness face according to the embodiments of the present disclosure further comprises: an image collection device configured to collect face images.

As an example, as executed by the computer or the at least one of the processors, the computer program instructions further performs steps of: calculating a face attribute in the face images; and recognizing the face action according to the calculated face attribute, wherein the face attribute comprises at least one of positions of face key points, face action coefficients and face gesture coefficients.

According to a still further aspect, there is provided an apparatus for authenticating liveness face, comprising: a random action instruction sequence generation module configured to generate a sequence of action instructions randomly; and a liveness face authentication module configured to determine a success of the authentication of the liveness face when face actions are determined to be matched with the sequence of action instructions sequentially.

As an example, the apparatus for authenticating liveness face according to the embodiments of the present disclosure further comprises: an instruction sequence issuing module configured to issue an action instruction which has a highest order currently among all un-issued action instructions in the sequence of action instructions, according to orders of action instructions in the sequence of action instructions.

As an example, the apparatus for authenticating liveness face according to the embodiments of the present disclosure further comprises: an action matching detection sub-module configured to determine whether a face action is matched with the action instruction issued; and an authentication result output sub-module configured to output an authentication result of the authentication of the liveness face.

As an example, in the apparatus for authenticating liveness face according to the embodiments of the present disclosure: with respect to each of the action instructions issued by the instruction sequence issuing module, the authentication result output sub-module determines a failure of the authentication of the liveness face when the action matching detection sub-module determines that a face action is not matched with the action instruction; with respect to each of the action instructions except for the one which has a lowest order in the sequence of action instructions issued by the instruction sequence issuing module, the instruction sequence issuing module issues a next action instruction only when the action matching detection sub-module determines that the face action is matched with the action instruction and there is the next action instruction to be issued in the instruction sequence issuing module; and with respect to the action instruction which has a lowest order in the sequence of action instructions issued by the instruction sequence issuing module, the authentication result output sub-module determines the success of the authentication of the liveness face when the action matching detection sub-module determines that a face action is matched with the action instruction.

As an example, the apparatus for authenticating liveness face according to the embodiments of the present disclosure further comprises: a timer configured to count a time period after each of the action instructions is issued.

As an example, in the apparatus for authenticating liveness face according to the embodiments of the present disclosure: with respect to each of the action instructions issued by the instruction sequence issuing module, the authentication result output sub-module determines a failure of the authentication of the liveness face when the action matching detection sub-module determines that no face action is detected before the timer is expired or when the action matching detection sub-module determines that a face action is not matched with the action instruction; with respect to each of the action instructions except for the one which has a lowest order in the sequence of action instructions issued by the instruction sequence issuing module, the instruction sequence issuing module issues a next action instruction only when the timer has not expired and the action matching detection sub-module determines that a face action is matched with the action instruction, while there is the next action instruction to be issued in the instruction sequence issuing module; and with respect to the action instruction which has a lowest order in the sequence of action instructions issued by the instruction sequence issuing module, the authentication result output sub-module determines the success of the authentication of the liveness face when the timer has not expired and the action matching detection sub-module determines that a face action is matched with the action instruction.

As an example, the apparatus for authenticating liveness face according to the embodiments of the present disclosure further comprises: an image acquiring module configured to acquire face images; a face attribute calculation module configured to calculate a face attribute in the face images; and a face action recognition module configured to recognize the face action according to the calculated face attribute, wherein the face attribute comprises at least one of positions of face key points, face action coefficients and face gesture coefficients.

As an example, the sequence of action instructions comprises at least one action instruction each being a single action instruction or a sequential action instruction, each sequential action instruction indicates to perform at least two single actions sequentially, each single action is a simple action or a complex action, each single action instruction indicates to perform one single action, each single action instruction is a simple action instruction or a complex action instruction, each simple action instruction indicates to perform one face action, and each complex action instruction indicates to perform at least two face actions simultaneously.

As an example, the sequence of action instructions comprises at least two action instructions each being a simple action instruction.

As an example, the at least one action instruction is an arbitrary combination of the simple action instruction and the complex action instruction, and at least part of the at least one action instruction is the complex action instruction.

As an example, the at least one action instruction is an arbitrary combination of the sequential action instruction and the single action instruction, and at least part of the at least one action instruction is the sequential action instruction.

In the method and system for authenticating the liveness face, the apparatus for authenticating the liveness face and the computer program product thereof according to the embodiments of the present disclosure, the sequence of action instructions is generated randomly, and whether the face actions are matched with the sequence of action instructions generated randomly can be judged based on the recognition of fine head actions, therefore it can be independent of the specified hardware device, such that a cost of the authentication of the liveness face can be reduced. In the other hand, it can resist the attacks made by means of various manners, such as photos, videos, 3D face models or masks effectively, thus the accuracy of the authentication of the liveness face can be improved, and in turn a security of the application scene to which the method and system for authenticating the liveness face, the apparatus for authenticating the liveness face and the computer program product thereof according to the embodiments of the present disclosure are applied can be enhanced.

Additional features and/or advantage of the present disclosure will be set forth in part in the description which follows and, in part, will be apparent from the description, or may be learned by practice of the invention. Other object and/or advantages of the present disclosure will be implemented and obtained from structures explained especially in the description, the claims and drawings.

BRIEF DESCRIPTION OF THE DRAWINGS

The above and other objects, features and advantages of the present disclosure will be more apparent by describing in detail exemplary embodiments thereof with reference to the attached drawings. The attached drawings are provided to further understanding of the embodiments of the present disclosure, which constitutes a part of the description and explains the present disclosure together with the embodiments of the present disclosure, instead of making any limitations on the present disclosure. In drawings, similar references signs are referred to same or similar parts or steps. In which.

DETAILED DESCRIPTION

Thereafter, exemplary embodiments of the present disclosure will be described in details in connection with attached drawings in order that the objects, solutions and advantages of the present disclosure will be more apparent. But obviously the described embodiments are only some, but not all of the embodiments of the present disclosure. It should be understood that the present disclosure is not limited to the exemplary embodiments described herein. Any other embodiments obtained by those ordinary skilled in the art based on the embodiments described in the present disclosure without inventive labors should fall into a scope sought for protection in the present disclosure.

Figure 1:
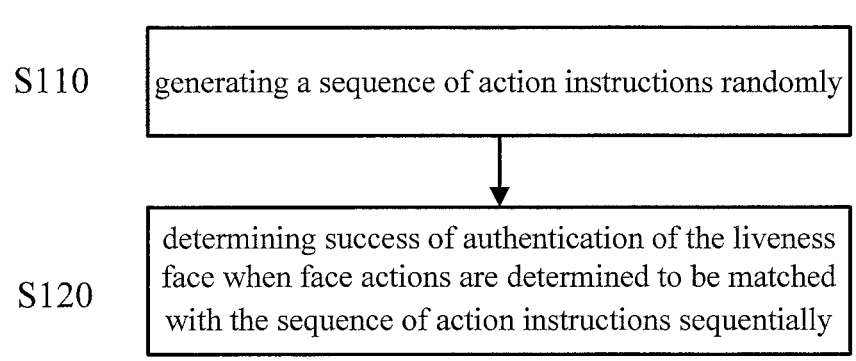
FIG. 1 is an exemplary flowchart illustrating a core concept of a method for authenticating a liveness face according to embodiments of the present disclosure.

FIG. 1 is an exemplary flowchart illustrating a core concept of a method for authenticating a liveness face according to the embodiments of the present disclosure.

As illustrated in FIG. 1, in the method 100 for authenticating the liveness face according to the embodiments of the present disclosure, firstly, a sequence of action instructions is generated randomly at step S110. The sequence of action instructions may comprise one or more action instructions.

For example, the sequence of action instructions may be generated by selecting action instructions from a preset set of action instructions. The preset set of action instructions may comprise, but is not limited to, at least part of following action instructions to indicate to: lower head, raise head, shake head, blink, close eyes, open mouth, smile, arch eyebrow, stick out tongue, smile while blinking, stick out tongue while blinking, open mouth while raising head, lower head while smiling, etc.

By generating the sequence of action instructions randomly, it is difficult to predict detail contents and orders of the action instructions in the sequence of action instructions, so that it is in turn difficult to make an attack according to the action instructions in advance, for example, by recording a face video in advance.

Next, at step S120, it is determined a success of the authentication of the liveness face when face actions are determined to be matched with the sequence of action instructions sequentially, that is, it is determined that the liveness face is detected.

As an example, it is determined that the liveness face is detected when the face actions are determined to be matched with the action instructions in the sequence of action instructions sequentially and in one-to-one correspondence.

Alternatively, a proportion threshold of face action matching may be set, and it may be determined that the liveness face is detected when a matching proportion between the face actions and the action instructions in the sequence of action instructions sequentially is determined to exceed the proportion threshold.

The method for authenticating the liveness face according to the embodiments of the present disclosure may be disposed at a face image collection side, for example, may be disposed at an image collection side in an entrance guard system in a security application field; and may be disposed at a personal terminal side, such as a mobile phone, a tablet computer, a personal computer and the like, in a financial application field.

Alternatively, the method for authenticating the liveness face according to the embodiments of the present disclosure may be disposed at a server side (or a cloud side) and the personal terminal side in a distribution manner. For example, in the financial application field, the sequence of action instructions may be generated randomly at the server side (or the cloud side), the server side (or the cloud side) transfers the sequence of action instructions generated randomly to the personal terminal, the personal terminal performs the authentication of the liveness face according to the received sequence of action instructions and the face actions, and then the personal terminal transmits the result of the authentication of the liveness face to the server side (or the cloud side). As another example, the sequence of action instructions may be generated randomly at the server side (or the cloud side), the server side (or the cloud side) transfers the sequence of action instructions generated randomly to the personal terminal, the personal terminal transfers the collected face images to the server side (or the cloud side), and then the server side (or the cloud side) performs the authentication of the liveness face according to the sequence of action instructions and the face actions. In the latter case, the server side (or the cloud side) may transfer the result of the authentication of liveness face to the personal terminal as required.

According to the method for authenticating the liveness face, with the sequence of random action instructions, it not only can resist the attacks made by means of photos, 3D models and face masks, but also can resist the attacks made by means of videos recorded in advance.

The method for authenticating the liveness face according to the embodiments of the present disclosure will described below in details by referring to FIGS. 2-4.

Figure 2:
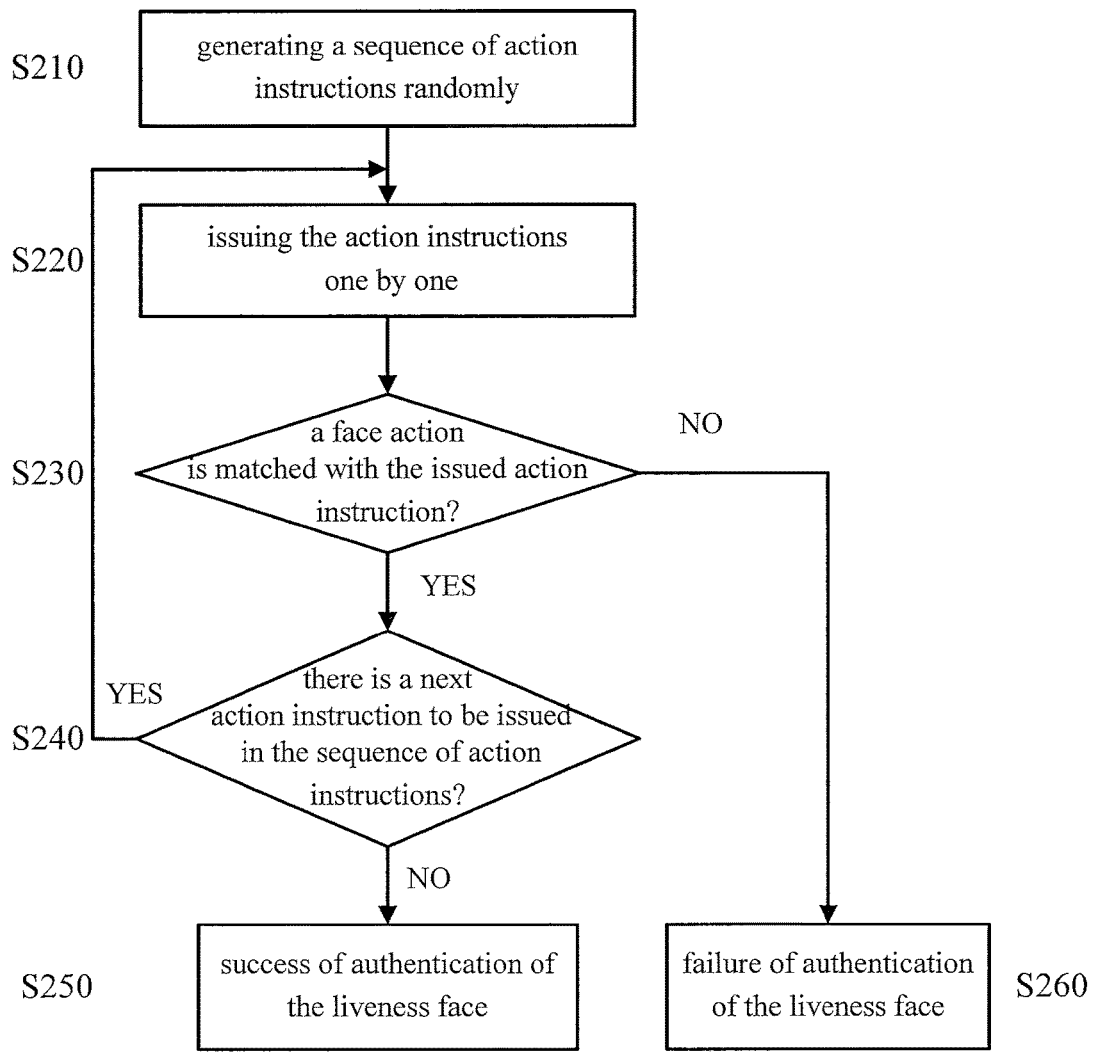
FIG. 2 is an exemplary flowchart illustrating a method for authenticating a liveness face according to a first embodiment of the present disclosure.

FIG. 2 is an exemplary flowchart illustrating a method for authenticating a liveness face according to a first embodiment of the present disclosure.

At step S210, a sequence of action instructions is generated randomly.

At step S220, the action instructions are issued one by one according to orders of the action instructions in the sequence of action instructions. For example, an action instruction which has a highest order currently among all un-issued action instructions in the sequence of action instructions is issued according to the orders of the action instructions in the sequence of action instructions.

At step S230, it is determined whether a face action is matched with the issued action instruction.

The method for authenticating the liveness face according to the embodiments of the present disclosure would progress to step S240 only when it is determined at step S230 that the face action is matched with the action instruction issued at step S220, otherwise, it is determined a failure of the authentication of the liveness face at step S260.

At step S240, it is determined whether there is a next action instruction to be issued in the sequence of action instructions.

The method for authenticating the liveness face according to the embodiments of the present disclosure would return to step S220 when it is determined that there is the next action instruction to be issued in the sequence of action instructions at step S240, in order to perform the matching judgment for the next action instruction.

When it is determined that there is no action instruction to be issued in the sequence of action instructions at step S240, that is, all action instructions in the sequence of action instructions have been issued and the face actions are matched with the action instructions one by one, it is determined that a success of the authentication of the liveness face at step S250, that is, the current face is determined as the liveness face.

Therefore, in the method for authenticating the liveness face according to the first embodiment of the present disclosure, with respect to each of the action instructions, a failure of the authentication for the liveness face is determined when a face action is determined to be not matched with the action instruction; with respect to each of the action instructions except for the one which has a lowest order in the sequence of action instructions, a next action instruction is issued only when a face action is determined to be matched with the action instruction and there is the next action instruction to be issued; and with respect to the action instruction which has a lowest order in the sequence of action instructions, the success of the authentication of the liveness face is determined when a face action is determined to be matched to the action instruction.

In the method for authenticating the liveness face according to the first embodiment of the present disclosure, with respect to each action instruction in the sequence of action instructions generated randomly, only when a user properly plays action corresponding to the action instruction (namely, it is determined that the face action is matched with the action instruction), the judgment for the next action instruction would be started.

Further, in the method for authenticating the liveness face according to the first embodiment of the present disclosure, with respect to the sequence of action instructions generated randomly, the authentication of the liveness face would be determined as successful only when the user passes the judgments for all actions asked for by the sequence of action instructions sequentially.

Figure 3:
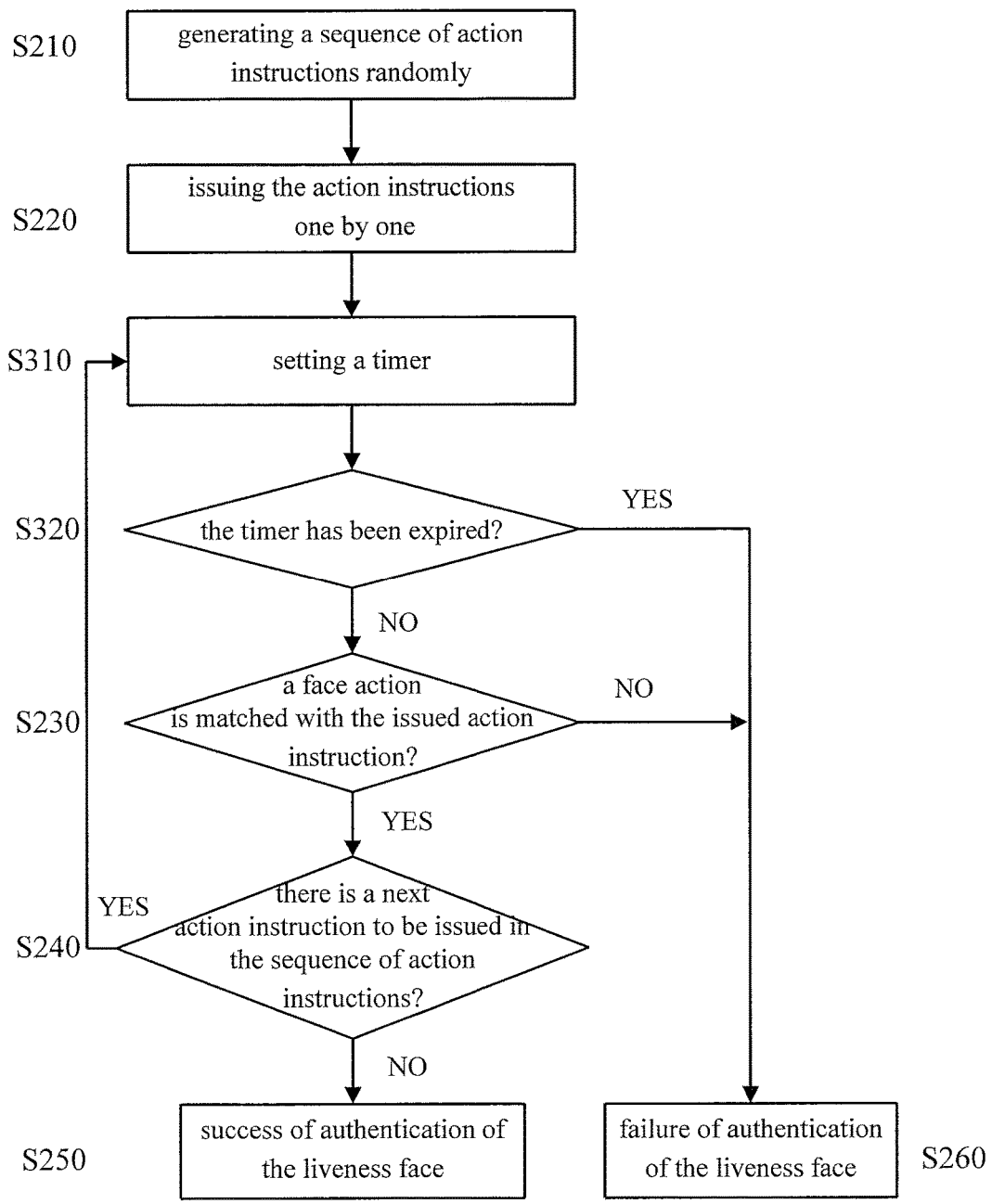
FIG. 3 is an exemplary flowchart illustrating a method for authenticating a liveness face according to a second embodiment of the present disclosure.

FIG. 3 is an exemplary flowchart illustrating a method for authenticating a liveness face according to a second embodiment of the present disclosure. As compared with the method for authenticating the liveness face according to the first embodiment of the present disclosure, the method for authenticating the liveness face according to the second embodiment of the present disclosure comprises a timer expiration judgment in a matching detection stage for each of the action instructions.

At step S210, a sequence of action instructions is generated randomly.

At step S220, the action instructions are issued one by one according to orders of the action instructions in the sequence of action instructions. For example, the action instruction which has a highest order currently among the all un-issued action instructions in the sequence of action instructions is issued according to the orders of the action instructions in the sequence of action instructions.

After the action instruction which has a highest order currently among all of the un-issued action instructions in the sequence of action instructions is issued, the method for authenticating the liveness face according to the second embodiment of the present disclosure perform a step S310 immediately, and a time period of a timer is set in step S310. It should be understood that, although step S220 and step S310 are described separately according to their functions in describing the second embodiment of the present disclosure, step S220 and step S310 may be combined together in fact.

At step S320, it is determined whether the time period of the timer has been expired. It can be determined whether no face action is detected within the time period of the timer at step S320. For example, it can be determined whether no recognizable face action is detected within the time period of the timer at step S320, the recognizable face action may comprise any face action in the preset set of the action instructions; or, it can be determined whether no face action (comprising not only the recognizable face action but also un-recognizable face action) is detected within the time period of the timer at step S320, the un-recognizable face action may refer to a face action which is not included in the preset set of the action instructions. In other words, the un-recognizable face action is a face action at first (which is different from a case where no face action occurs on the face), but it can not be recognized because it is not included in the preset set of the action instructions.

The method for authenticating the liveness face according to the second embodiment of the present disclosure progresses to step S260 and determines a failure of the authentication of the liveness face when the time period of the timer is determined to be expired at step S320.

The method for authenticating the liveness face according to the second embodiment of the present disclosure progresses to step S230 when the time period of the timer is determined to be not expired at step S320.

In the method for authenticating the liveness face according to the second embodiment of the present disclosure, with respect to each of the action instructions in the sequence of action instructions generated randomly, the action matching detection for the action instruction would pass only when the user completes the specified action within a specified time period and does not make an obvious wrong action. Herein, the obvious wrong action may comprise the recognizable face action unmatched with the current action instruction, or may further comprise the obvious un-recognizable face action unmatched with the current action instruction depending on actual requirements.

For example, if the action instruction currently issued is a blinking instruction and the time period is 5 seconds, a result to indicate the failure of the authentication of the liveness face would be obtained when the detected user's face action is smiling, shaking head, sticking out tongue and the like, no matter whether the time period has been expired; on the other hand, the result to indicate the failure of the authentication of the liveness face would also be obtained when no valid face action is detected within the time period, that is, neither the blinking action nor any other recognizable face action is detected.

Next, operations at step S230-step S260 are same as those at step S230-step S260 in the first embodiment described by referring to FIG. 2, and details are not repeated herein.

Therefore, in the method for authenticating the liveness face according to the second embodiment of the present disclosure, with respect to each of the action instructions, the failure of the authentication of the liveness face is determined when no face action is detected within the time period after the action instruction is issued or when a face action is determined to be not matched with the action instruction; with respect to each of the action instructions except for the one which has a lowest order in the sequence of action instructions, a next action instruction is issued only when a face action is detected within the time period after the action instruction is issued and is determined to be matched with the action instruction, while there is the next action instruction to be issued; and with respect to the action instruction which has a lowest order in the sequence of action instructions, the success of the authentication of the liveness face is determined when a face action detected within the time period after the action instruction is issued is determined to be matched with the action instruction.

Figure 4:
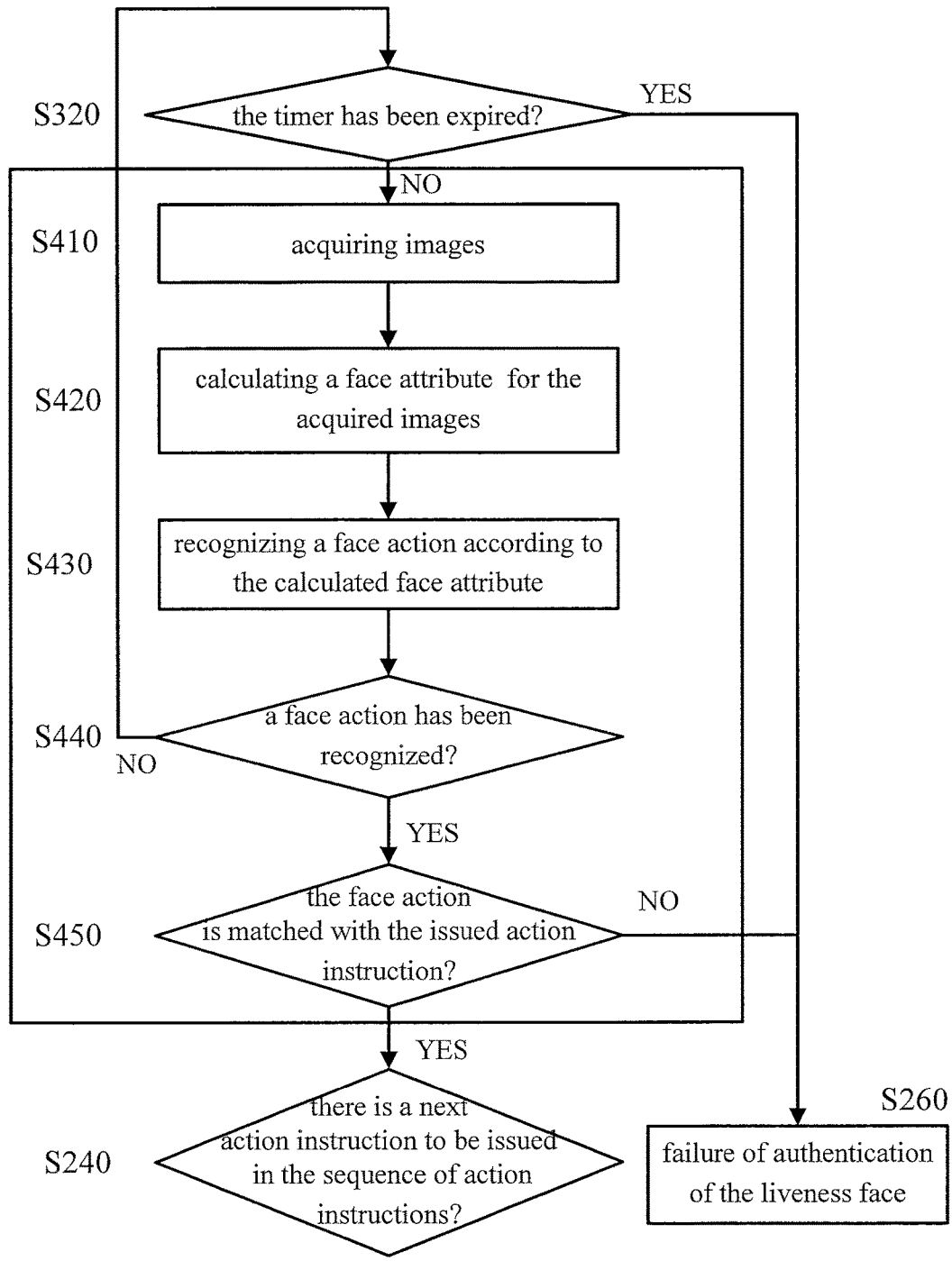
FIG. 4 is an exemplary flowchart illustrating a process for determining whether a face action is matched with an action instruction according to the embodiments of the present disclosure.

FIG. 4 is an exemplary flowchart illustrating step S230 for determining whether a face action is matched with the issued action instruction in the method for authenticating the liveness face according to the embodiments of the present disclosure.

At step S410, images are acquired. Gray or color images may be collected by an image collection device, the image collection device may be a camera in a smart phone, a camera in a tablet computer, a camera in a personal computer or even may be a network camera, and the gray or color images collected by the image collection device may be received from the image collection device.

At step S420, a face attribute is calculated for the acquired images. Features such as key points, gestures, expressions, head actions on the face are referred to as the face attribute collectively.

At step S430, a face action is recognized according to the calculated face attribute.

Herein, the face attribute may comprise at least one of positions of face key points, face action coefficients and face gesture coefficients.

As an example, it may be determined whether a face is included in the acquired image firstly, and then key points on the face may be located in a case that the face is detected. The face key points are some key points on the face having a strong representation ability, for example, the eye, the canthus, the center in the eye, the eyebrow, the nose, the nasal tip, the mouth, the corner of mouth, the face profile and the like. For example, a traditional method for locating the face key points may be utilized, in which a parameter model may be created and learned according to representation characteristics around the key points based on a parameter shape model, and the positions of the key points are optimized iteratively as used and thus coordinates of the key points can be obtained. Alternatively, the key points may be located by a cascade regression scheme which may locate the face key points accurately in real time according to the input face images.

The locating of the face key points plays an important role in the recognition of the face action, however it should be understood that the detailed method for locating the face key points utilized would not be constructed as a limitation on the present disclosure. Whether the existing method for locating the face key points or methods for locating the face key points developed in future may be applied to the method for authenticating the liveness face according to the embodiments of the present disclosure and also should fall into the scope sought for protection by the present disclosure.

A plurality of face pictures corresponding to the face actions specified (for example, the face actions corresponding to the face actions in the preset set of the action instructions) in advanced may be obtained previously, the detailed face actions are then marked manually, thus a face action model library can be established in advance by a machine learning method.

In a case where the face attribute only comprises the face key points, the face actions may be recognized by means of various calculation methods, such as an iterative calculation method, a neural network method, a fuzzy computation method, etc., according to the calculated face key points and face key point models in the face action model library.

Further, in a case where the face attribute comprises the action coefficients and/or the gesture coefficients, for example, the action coefficients and/or the gesture coefficients of the face may be calculated according to the calculated face key points and the face key point models in the face action model library. Herein, the gesture coefficients specifically refer to a gesture execution degree of lowering head, raising head, shaking head and turning head, for example, a head turning-left coefficient may refer to a degree of turning the head left. The action coefficients refer to an execution degree of other actions except for lowering head, raising head, shaking head and turning head, for example, a mouth opening coefficient may refer to a degree of opening the mouth while an eye closing coefficient may refer to a degree of closing the eyes. For example, the action coefficients may comprise, but is not limited to, a smiling coefficient, a blinking coefficient, the mouth opening coefficient, an eyebrow arching coefficient, a tongue sticking coefficient, etc. The gesture coefficients may comprise, but is not limited to, a head turning-left coefficient, a head turning-right coefficient, a head lowering coefficient, a head raising coefficient, etc.

For example, a rotation matrix may be obtained by iterations with the located face key points and the face key point models in the face action model library, and a head turning-left angle, a head turning-right angle, a head raising angle or a head lowering angle may be determined according to the rotation matrix, then the corresponding gesture (action) may be determined as to be detected when the corresponding angle is greater than a corresponding detection angle threshold (for example, 30°). For example, it may be determined that the head turning-left action is detected when the head turning-left angle is greater than its detection angle threshold; it may be determined that the head turning-right action is detected when the head turning-right angle is greater than its detection angle threshold; it may be determined that the head raising action is detected when the head raising angle is greater than its detection angle threshold; and it may be determined that the head lowering action is detected when the head lowering angle is greater than its detection angle threshold. Herein, the head turning-left angle may function as the head turning-left coefficient, the head turning-right angle may function as the head turning-right coefficient, the head lowering angle may be as the raising head coefficient, and the head raising angle may function as the head raising coefficient.

Of course, the present disclosure is not limited to calculate the action coefficients and/or the gesture coefficients according to the calculated face key points.

As an example, the face attribute may only comprise the action coefficients and/or the gesture coefficient, the action coefficients and/or gesture coefficients may be obtained by an action/gesture recognition method existed currently or developed in future, and these manners for calculating the face attributes should fall into the scope sought for protection by the present disclosure.

Herein, the face key points located at step S420 are 2D key points, however, the face key point models in the face action model library may be 3D key points or 2D key points.

At step S440, it is determined whether a face action has been recognized.

The method for authenticating the liveness face according to the embodiments of the present disclosure returns to step S320 and goes on to acquire images when it is determined that no face action is recognized at step S440.

The method for authenticating the liveness face according to the embodiments of the present disclosure progresses to step S450 when it is determined that a face action is recognized at step S440.

At step S450, it is determined whether the recognized face action is matched with the action instruction.

The method for authenticating the liveness face according to the embodiments of the present disclosure progresses to step S240 when it is determined that the recognized face action is matched with the action instruction at step S450.

On the contrary, the method for authenticating the liveness face according to the embodiments of the present disclosure progresses to step S260 and determines the failure of the authentication of the liveness face when it is determined that the recognized face action is not matched with the action instruction at step S450.

External input required in the embodiments of the present disclosure only comprises general images, for example, a sequence of general video images, and only interactions with the user on a screen are needed, therefore no specified hardware is required, so that the embodiments of the present disclosure can be disposed at the face image collection side, for example, may be disposed at the image collection side in the entrance guard system in the security application field; and may be disposed at the personal terminal side, such as the mobile phone, the tablet computer, the personal computer and the like, in the financial application field.

Obviously, the embodiments of the present disclosure are not limited thereto, and the method for authenticating the liveness face according to the embodiments of the present disclosure may be disposed at the server side (or the cloud side) and the personal terminal side in the distribution manner.

Figure 5:
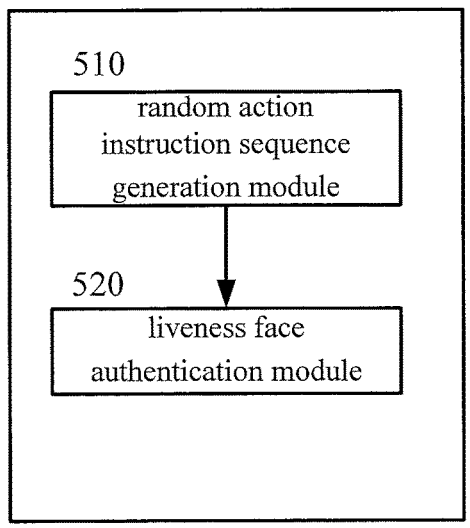
FIG. 5 is an exemplary block diagram illustrating an apparatus for authenticating a liveness face according the embodiments of the present disclosure.

FIG. 5 is an exemplary block diagram illustrating an apparatus for authenticating a liveness face according the embodiments of the present disclosure.

The apparatus 500 for authenticating the liveness face according to the embodiments of the present disclosure comprises a random action instruction sequence generation module 510 and a liveness face authentication module 520.

The random action instruction sequence generation module 510 generates a sequence of action instructions randomly.

The liveness face authentication module 520 performs authentication of the liveness face, and determines a success of the authentication of the liveness face when face actions are determined to be matched with the sequence of action instructions sequentially, that is, determines that the liveness face is detected.

Here, the random action instruction sequence generation module 510 and the liveness face authentication module 520 may be hardware, software, fireware or any suitable combination thereof.

Figure 6:
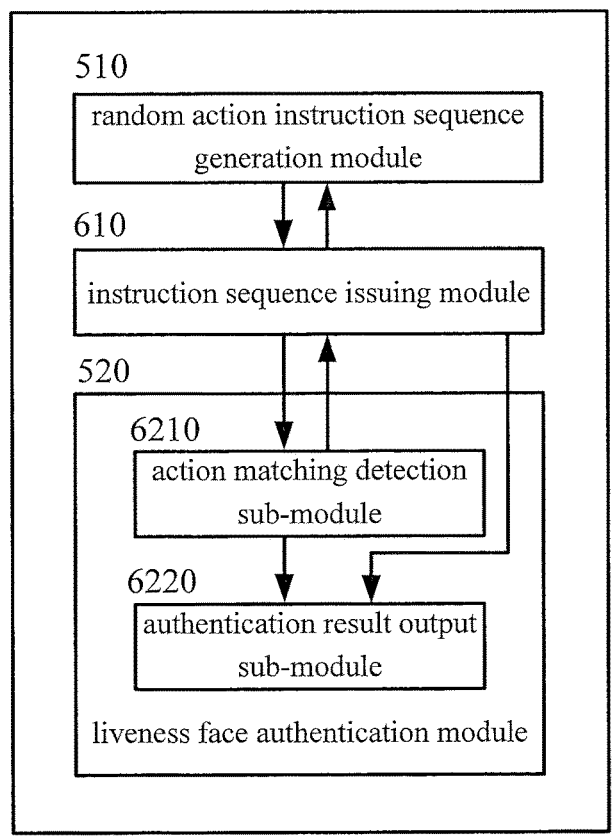
FIG. 6 is an exemplary block diagram illustrating an apparatus for authenticating a liveness face according to the first embodiment of the present disclosure.

FIG. 6 is an exemplary block diagram illustrating an apparatus for authenticating a liveness face according to the first embodiment of the present disclosure.

The apparatus for authenticating the liveness face according to the first embodiment of the present disclosure comprises the random action instruction sequence generation module 510, an instruction sequence issuing module 610 and the liveness face authentication module 520. The liveness face authentication module 520 may comprise an action matching detection sub-module 6210 and an authentication result output sub-module 6220.

The random action instruction sequence generation module 510 generates a sequence of action instructions randomly.

The instruction sequence issuing module 610 issues the action instruction which has a highest order currently among all un-issued action instructions in the sequence of action instructions, according the orders of the action instructions in the sequence of action instructions.

The action matching detection sub-module 6210 determines whether the face action is matched to the action instruction issued.

The authentication result output sub-module 6220 outputs the authentication result, that is, success or failure, of the authentication of the liveness face, according to a detection result from the action matching detection sub-module 6210 and a last instruction indication from the instruction sequence issuing module 610.

Further, the instruction sequence issuing module 610 further determines whether there is a next action instruction to be issued in the sequence of action instructions when the action matching detection sub-module 6210 determines that the face action is matched with the action instruction issued currently by the instruction sequence issuing module 610, and issues the action instruction which has a highest order currently among all un-issued action instructions in the sequence of action instructions when it is determined that there is a next action instruction to be issued in the sequence of action instructions.

The authentication result output sub-module 6220 outputs the result indicating the success of the authentication of the liveness face, when the action matching detection sub-module 6210 determines that the face action is matched with the action instruction issued currently by the instruction sequence issuing module 610 and the instruction sequence issuing module 610 determines that there is no further action instruction to be issued.

The authentication result output sub-module 6220 outputs the result indicating the failure of the authentication of the liveness face, when the action matching detection sub-module 6210 determines that the face action is not matched with the action instruction issued currently by the instruction sequence issuing module 610.

Therefore, with respect to each of the action instructions issued by the instruction sequence issuing module 610, the authentication result output sub-module 6220 determines the failure of the authentication for the liveness face when the action matching detection sub-module 6210 determines that the face action is not matched with the action instruction. With respect to each of the action instructions except for the one which has a lowest order in the sequence of action instructions issued by the instruction sequence issuing module 610, the instruction sequence issuing module 610 issues a next action instruction only when the action matching detection sub-module 6210 determines that the face action is matched with the action instruction and there is the next action instruction to be issued in the instruction sequence issuing module 610. With respect to the action instruction which has a lowest order in the sequence of action instructions issued by the instruction sequence issuing module 610, the authentication result output sub-module 6220 determines the success of the authentication of the liveness face when the action matching detection sub-module 6210 determines that the face action is matched with the action instruction.

In the apparatus for authenticating the liveness face according to the first embodiment of the present disclosure, with respect to each of the action instructions in the sequence of action instructions generated randomly, only when the user properly plays action corresponding to the action instruction (namely, it is determined that the face action is matched with the action instruction), the judgment for a next action instruction would be started.

Further, in the apparatus for authenticating the liveness face according to the first embodiment of the present disclosure, with respect to the sequence of action instructions generated randomly, the authentication of the liveness face would be determined as successful only when the user passes the judgments for all actions asked for by the sequence of action instructions sequentially.

Here, the random action instruction sequence generation module 510, the instruction sequence issuing module 610, the action matching detection sub-module 6210 and the authentication result output sub-module 6220 may be hardware, software, firmware or any suitable combination thereof.

Figure 7:
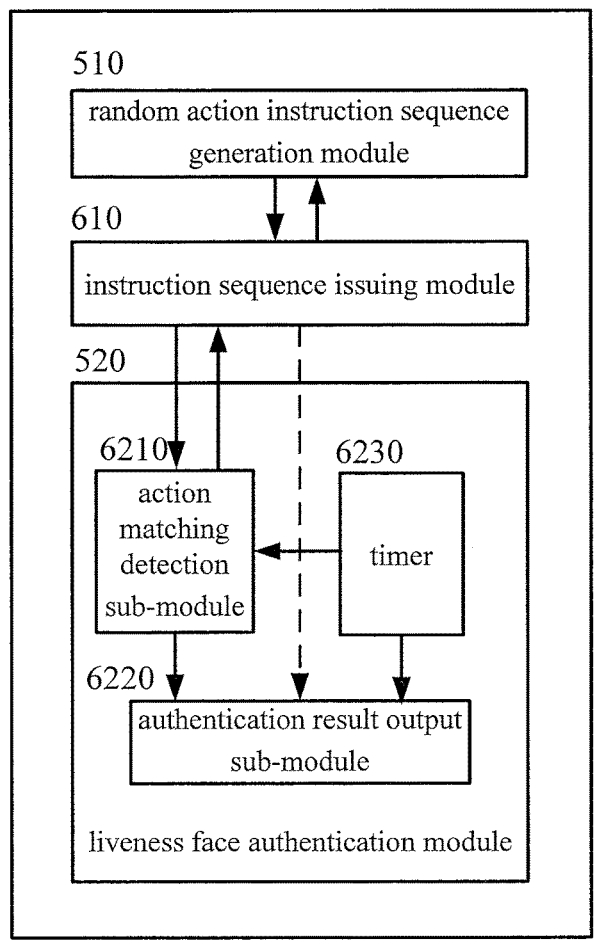
FIG. 7 is an exemplary block diagram illustrating an apparatus for authenticating a liveness face according to the second embodiment of the present disclosure.

FIG. 7 is an exemplary block diagram illustrating an apparatus for authenticating a liveness face according to the second embodiment of the present disclosure.

The apparatus for authenticating the liveness face according to the second embodiment of the present disclosure comprises the random action instruction sequence generation module 510, the instruction sequence issuing module 610 and the liveness face authentication module 520. The liveness face authentication module 520 may comprise the action matching detection sub-module 6210, the authentication result output sub-module 6220 and a timer 6230.

The random action instruction sequence generation module 510 generates a sequence of action instructions randomly.

The instruction sequence issuing module 610 issues the action instruction which has a highest order currently among all un-issued action instructions in the sequence of action instructions, according the orders of the action instructions in the sequence of action instructions.

The timer 6230 counts a time period after each of the action instructions is issued.

After the instruction sequence issuing module 610 issues the action instruction which has a highest order currently, the timer 6230 is trigged to start to count. The time period of the timer 6230 may be preset, for example, the time period of the timer 6230 may be set as, but is not limited to, 3 seconds, 5 seconds or 10 seconds. The timer 6230 outputs a timer expiration signal after the time period has been expired.

The action matching detection sub-module 6210 determines whether the face action is matched with the action instruction issued, when the timer 6230 has not expired.

Further, the instruction sequence issuing module 610 further determines whether there is a next action instruction to be issued in the sequence of action instructions when the action matching detection sub-module 6210 determines that the face action is matched with the action instruction issued at step S220, and issues the action instruction which has a highest order currently among all un-issued action instructions in the sequence of action instructions when it is determined that there is a next action instruction to be issued in the sequence of action instructions.

The authentication result output sub-module 6220 outputs the result indicating the success of the authentication of the liveness face, when the timer 6230 has not expired, the action matching detection sub-module 6210 determines that the face action is matched with the action instruction issued currently by the instruction sequence issuing module 610 and the instruction sequence issuing module 610 determines that there is no further action instruction to be issued.

The authentication result output sub-module 6220 outputs the result indicating the failure of the authentication of the liveness face, when the action matching detection sub-module 6210 determines that the face action is not matched with the action instruction issued currently by the instruction sequence issuing module 610.

The authentication result output sub-module 6220 outputs the result indicating the failure of the authentication of the liveness face when the timer 6230 outputs the timer expiration signal.

Therefore, with respect to each of the action instructions issued by the instruction sequence issuing module 610, the authentication result output sub-module 6220 determines the failure of the authentication of the liveness face when the action matching detection sub-module 6210 determines that no face action is detected after the timer 6230 has expired or when the action matching detection sub-module 6210 determines that a face action is not matched with the action instruction. With respect to each of the action instructions except for the one which has a lowest order in the sequence of action instructions issued by the instruction sequence issuing module 610, the instruction sequence issuing module 610 issues the next action instruction only when the timer 6230 has not expired and the action matching detection sub-module 6210 determines that a face action is matched with the action instruction, while there is a next action instruction to be issued in the instruction sequence issuing module 610. With respect to the action instruction which has a lowest order in the sequence of action instructions issued by the instruction sequence issuing module 610, the authentication result output sub-module 6220 determines the success of the authentication of the liveness face when the timer 6230 has expired and the action matching detection sub-module 6210 determines that a face action is matched with the action instruction.

Here, the random action instruction sequence generation module 510, the instruction sequence issuing module 610, the action matching detection sub-module 6210, the authentication result output sub-module 6220 and the timer 6230 may be hardware, software, fireware or any suitable combination thereof.

Further, the apparatus for authenticating the live face according to the embodiments of the present disclosure may further comprise: an image acquiring module (not shown), a face attribute calculation module (not shown) and a face action recognition module (not shown). The image acquiring module acquires face images. The face attribute calculation module calculates the face attribute in the acquired face images. The face action recognition module recognizes the face action according to the calculated face attribute, wherein the face attribute comprises at least one of positions of face key points, face action coefficients and face gesture coefficients.

In the apparatus for authenticating the liveness face according to the second embodiment of the present disclosure, with respect to each of the action instructions in the sequence of action instructions generated randomly, the action matching detection for the action instruction would pass only when the user completes the specified action within a specified time period and does not make an obvious wrong action. Herein, the obvious wrong action may comprise a recognizable face action unmatched with the current action instruction, or may further comprise an obvious un-recognizable face action unmatched with the current action instruction depending on actual requirements.

For example, if the action instruction currently issued by the instruction sequence issuing module 610 is a blinking instruction and the time period of the timer 6230 is 5 seconds, the authentication result output sub-module 6220 would obtain a result to indicate the failure of the authentication of the liveness face when the detected user's face action is smiling, shaking head, sticking out tongue and the like and in turn the action matching detection sub-module 6210 determines that the face action is not matched with the action instruction, no matter whether the time period has been expired; on the other hand, the authentication result output sub-module 6220 would also obtain the result to indicate the failure of the authentication of the liveness face when no valid face action has been detected within the time period of the timer 6230, that is, neither the blinking action nor any other recognizable face action is detected.

Here, the image acquiring module, the face attribute calculation module and the face action recognition module may be hardware, software, firmware or any suitable combination thereof.

Next, the sequence of action instructions generated randomly in the embodiments of the present disclosure will be described in details below. The sequence of action instructions according to the embodiments of the present disclosure may comprise at least one action instruction each being an single action instruction or an sequential action instruction, each sequential action instruction indicates to perform at least two single actions sequentially, each single action is a simple action or a complex action, each single action instruction indicates to perform one single action, each single action instruction is a simple action instruction or a complex action instruction, each simple action instruction indicates to perform one face action, and each complex action instruction indicates to perform at least two face actions simultaneously. In the embodiments of the present disclosure, the simple action may refer to an action only involving to one face action, such as blinking, closing eyes, smiling, nodding head, shaking head, etc; and the complex action may refer to an action performing at least two face actions simultaneously, for example, opening mouse while turning head left, closing eyes while raising head, etc.

Examples of the sequence of action instructions would be given in connection with the method and apparatus for authenticating the liveness face according to the second embodiment of the present disclosure.

First Example

In this First Example, the sequence of action instructions comprises at least two action instructions each being the simple action instruction.

The sequence of action instructions generated randomly by the random action instruction sequence generation module 510 comprises two action instructions each being the simple action instruction. For example, the sequence of action instructions sequentially comprises a blinking action instruction (a first action instruction) and a mouth opening action instruction (a second action instruction).

The instruction sequence issuing module 610 issues the blinking action instruction at first, and the timer 6230 starts to count.

The instruction sequence issuing module 610 issues the mouth opening action instruction and the timer 6230 restarts to count, when the action matching detection sub-module 6210 determines that a face action is the blinking action and the timer 6230 has not expired.

Next, the authentication result output sub-module 6220 outputs the result indicating the success of the authentication of the liveness face, when the action matching detection sub-module 6210 determines that a face action is the mouth opening action and the timer 6230 has not expired.

However, during the process for detecting the blinking action, if the timer 6230 has not expired but the action matching detection sub-module 6210 determines that the face action is a tongue sticking action or the timer 6230 has expired but the action matching detection sub-module 6210 fails to detect any recognizable face action, the authentication result output sub-module 6220 outputs the result indicating the failure of the authentication of the liveness face. Herein, the recognizable face action may comprise the face actions predefined in the face action model library described above.

On the other hand, during the process for detecting the mouth opening action, if the timer 6230 has not expired but the action matching detection sub-module 6210 determines that a face action is a head shaking action, or the timer 6230 has expired but the action matching detection sub-module 6210 fails to detect any recognizable face action, the authentication result output sub-module 6220 outputs the result indicating the failure of the authentication of the liveness face.

Optionally, when the timer 6230 has not expired but the action matching detection sub-module 6210 detects an un-recognizable face action, the authentication result output sub-module 6220 also may either output the result indicating the failure of the authentication of the liveness face or continue to detect the face action. Herein, the un-recognizable face action may be a face action unpredefined in the face action model library, and is different from no face action. For example, the un-recognizable face action may be an action for shielding eyes or face with the hand.

In this example, it can resist attacks for the fixed action instructions well because of a randomization of the action instructions, although the sequence of action instructions generated randomly only comprises two simple action instructions.

Second Example

In this Second Example, the at least one action instruction is an arbitrary combination of the simple action instruction and the complex action instruction, and at least part of the at least one action instruction is the complex action instruction.

For example, the sequence of action instructions generated by the random action instruction sequence generation module 510 only comprises one complex action instruction, which is an action instruction indicating to open mouth while turning head left.

The instruction sequence issuing module 610 issues the action instruction indicating to open mouth while turning head left.

If the action matching detection sub-module 6210 determines that a face action is an action of opening mouth while turning head left and the timer 6230 has not expired, the authentication result output sub-module 6220 outputs the result indicating the success of the authentication of the liveness face.

However, if the timer 6230 has not expired but the action matching detection sub-module 6210 determines that a face action is a head lowering action, or the timer 6230 has expired but the action matching detection sub-module 6210 fails to detect any recognizable face action, the authentication result output sub-module 6220 outputs the result indicating the failure of the authentication of the liveness face.

Optionally, if the timer 6230 has not expired but the action matching detection sub-module 6210 detects an un-recognizable face action, the authentication result output sub-module 6220 also may either output the result indicating the failure of the authentication of the liveness face or continue to detect a face action depending on actual requirements.

In this example, the sequence of action instructions generated randomly comprises the complex action instruction, therefore the authentication of the liveness face is more accuracy and it has a stronger anti-attack ability, as compared with the simple action instruction.

Third Example

In this Third Example, as same as the Second Example, the at least one action instruction is an arbitrary combination of the simple action instruction and the complex action instruction, and at least part of the at least one action instruction is the complex action instruction.

For example, the sequence of action instructions generated randomly by the random action instruction sequence generation module 510 may comprise two action instructions, wherein the first action instruction is an action instruction indicating to stick out tongue while raising head (the complex action instruction) and the second action instruction is a smiling action instruction (the simple action instruction).

The instruction sequence issuing module 610 issues the action instruction indicating to stick out tongue while raising head at first and the timer 6230 starts to count.

If the action matching detection sub-module 6210 determines that a face action is the action of sticking out tongue while raising head and the timer 6230 has not expired, the instruction sequence issuing module 610 determines that there is another action instruction (namely the second action instruction) to be issued.

Next, the instruction sequence issuing module 610 then issues the smiling action instruction and the timer 6230 restarts to count.

Next, if the action matching detection sub-module 6210 determines that a face action is the smiling action and the timer 6230 has not expired, the instruction sequence issuing module 610 determines that no action instruction should be issued. At this time, the authentication result output sub-module 6220 outputs the result indicating the success of the authentication of the liveness face.

On the other hand, if the action matching detection sub-module 6210 determines that a face action is a head shaking action (that is, a recognizable face action) and the timer 6230 has not expired or the timer 6230 has expired, after the instruction sequence issuing module 610 issues the action instruction indicating to stick out tongue while raising head, the authentication result output sub-module 6220 outputs the result indicating the failure of the authentication of the liveness face.

Furthermore, if the action matching detection sub-module 6210 determines that a face action is a nodding action (that is, a recognizable face action) and the timer 6230 has not expired or the timer 6230 has expired after the instruction sequence issuing module 610 issues the smiling action instruction, the authentication result output sub-module 6220 outputs the result indicating the failure of the authentication of the liveness face.

In this example, the sequence of action instructions generated randomly comprises a plurality of action instructions at least including the complex action instruction, therefore requirements for the authentication of the liveness face are increased so that attacks made by means of videos, 3D face models and masks can be resisted better as compared with only one action instruction.

Fourth Example

Among the First Example to the Third Example, each of the action instructions is the single action instruction no matter of the simple action instruction and the complex action instruction.

In this Fourth Example, the at least one action instruction is an arbitrary combination of the sequential action instruction and the single action instruction, and at least part of the at least one action instruction is the sequential action instruction.

For example, the sequence of action instructions generated randomly by the random action instruction sequence generation module 510 comprises a sequential action instruction indicating to blink first and then stick out tongue. In this case, if the timer 6230 has not expired and the action matching detection sub-module 6210 recognizes a blinking action at first and then recognizes a tongue sticking action, the authentication result output sub-module 6220 outputs the result indicating the success of the authentication of the liveness face. Instead, if the timer 6230 has expired or the action matching detection sub-module 6210 detects a recognizable face action (for example, smiling, shaking head, or sticking out tongue, or blinking first and then smiling) different from the issued sequential action instruction, the authentication result output sub-module 6220 outputs the result indicating the failure of the authentication of the liveness face.

As another example, the sequence of action instructions generated randomly by the random action instruction sequence generation module 510 comprises two sequential action instructions, the first action instruction is an action instruction indicating to blink first and then stick out tongue and the second action instruction is an action instruction indicating to smile first and then raise head. In this case, if the timer 6230 has not expired and the action matching detection sub-module 6210 recognizes a blinking action at first and then recognizes a tongue sticking action, the instruction sequence issuing module 610 goes on to issue the second action instruction and the timer 6230 is reset. Next, if the timer 6230 has not expired and the action matching detection sub-module 6210 recognizes a smiling action at first and then recognizes a head raising action, the authentication result output sub-module 6220 outputs the result indicating the success of the authentication of the liveness face. Instead, if the timer 6230 has expired, or the action matching detection sub-module 6210 detects a recognizable face action different from the first action instruction or the second action instruction, the authentication result output sub-module 6220 outputs the result indicating the failure of the authentication of the liveness face.

As another example, the sequence of action instructions generated randomly by the random action instruction sequence generation module 510 comprises a sequential action instruction and a simple action instruction, the first action instruction is the sequential action instruction, such as the sequential action instruction indicating to blink first and then stick out tongue, and the second action instruction is the simple action instruction, such as the action instruction indicating to open mouth while shaking head (the complex action instruction). In this case, if the timer 6230 has not expired, and the action matching detection sub-module 6210 recognizes a blinking action at first and then recognizes a tongue sticking action, the instruction sequence issuing module 610 goes on to issue the second action instruction and the timer 6230 is reset. Next, if the timer 6230 has not expired and the action matching detection sub-module 6210 recognizes an action of opening mouth while shaking head, the authentication result output sub-module 6220 outputs the result indicating the success of the authentication of the liveness face.

Examples of the sequence of action instructions which may be generated randomly and utilized in the method and apparatus for authenticating the liveness face according to the embodiments of the present disclosure are explained above. More complex the sequence of action instructions is, higher a reliability in the authentication of the liveness face is, and stronger the anti-attack ability for videos and 3D face models is.

Figure 8:
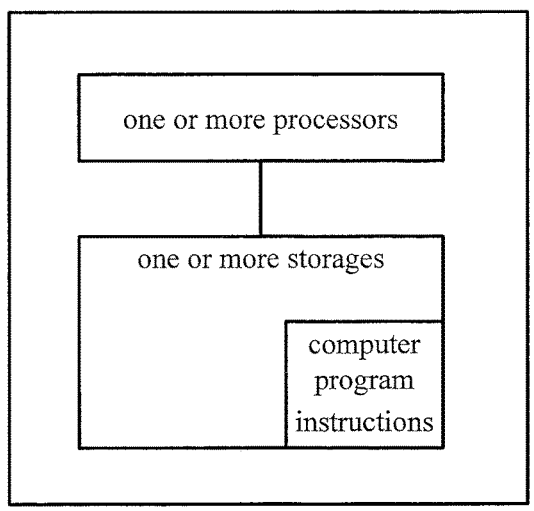
FIG. 8 is an exemplary block diagram illustrating a system for authenticating a liveness face according the embodiments of the present disclosure.

FIG. 8 is an exemplary block diagram illustrating a system for authenticating a liveness face according the embodiments of the present disclosure.

As illustrated in FIG. 8, the system for authenticating liveness face according to the embodiments of the present disclosure comprises: one or more processors; one or more storages; computer program instructions stored in at least one of the storages.

As executed by at least one of the processors, the computer program instructions may implement functions of the respective functional modules in the apparatus for authenticating the liveness face according to the embodiments of the present disclosure, and/or perform the method for authenticating the liveness face according to the embodiments of the present disclosure.

Particularly, as executed by at least one of the processors, the computer program instructions performs steps of: generating a sequence of action instructions randomly; and determining a success of authentication of a liveness face when face actions are determined to be matched with the sequence of action instructions sequentially.

For example, as executed by at least one of the processors, the computer program instructions may implement the method for authenticating the liveness face according to the first embodiment of the present disclosure, and perform steps of: issuing an action instruction which has a highest order currently among all un-issued action instructions in the sequence of action instructions, according to orders of the action instructions in the sequence of action instructions; with respect to each of the action instructions, determining a failure of the authentication for the liveness face when a face action is determined to be not matched with the action instruction; with respect to each of the action instructions except for the one which has a lowest order in the sequence of action instructions, issuing a next action instruction only when a face action is determined to be matched with the action instruction and there is the next action instruction to be issued; and with respect to the action instruction which has a lowest order in the sequence of action instructions, determining the success of the authentication of the liveness face when a face action is determined to be matched with the action instruction.

As another example, as executed by at least one of the processors, the computer program instructions may implement the method for authenticating the liveness face according to the second embodiment of the present disclosure, and performs steps of: issuing an action instruction which has a highest order currently among all un-issued action instructions in the sequence of action instructions, according to orders of the action instructions in the sequence of action instructions; with respect to each of the action instructions, determining a failure of the authentication of the liveness face when no face action is detected within a time period after the action instruction is issued or when a face action is determined to be not matched with the action instruction; with respect to each of the action instructions except for the one which has a lowest order in the sequence of action instructions, a next action instruction is issued only when a face action is detected within the time period after the action instruction is issued and is determined to be matched with the action instruction, while there is the next action instruction to be issued; and with respect to the action instruction which has a lowest order in the sequence of action instructions, determining the success of the authentication of the liveness face when a face action detected within the time period after the action instruction is issued is determined to be matched with the action instruction.

Further, as executed by at least one of the processors, the computer program instructions further performs steps of: acquiring face images; calculating a face attribute in the face images; and recognizing the face action according to the calculated face attribute, wherein the face attribute comprises at least one of positions of face key points, face action coefficients and face gesture coefficients.

Further, the system for authenticating the liveness face according to the embodiments of the present disclosure may further comprise: an image collection device configured to collect the face images.

In this case, the system for authenticating the liveness face according to the embodiments of the present disclosure acquires the image faces from the image collection device as the computer program instructions are executed by at least one of the processors.

Furthermore, according to the embodiments of the present disclosure, there is further provided a computer program product. The computer program product comprises a computer-readable storage medium on which computer program instructions are stored.

As executed by a computer, the computer program instructions may implement functions of the respective functional modules in the apparatus for authenticating the liveness face according to the embodiments of the present disclosure, and/or perform the method for authenticating the liveness face according to the embodiments of the present disclosure For example, as executed by the computer, the computer program instructions performs steps of: generating a sequence of action instructions randomly; and determining a success of authentication of a liveness face when face actions are determined to be matched with the sequence of action instructions sequentially.

As an example, as executed by the computer, the computer program instructions may implement the method for authenticating the liveness face according to the first embodiment of the present disclosure, and perform steps of issuing an action instruction which has a highest order currently among all un-issued action instructions in the sequence of action instructions, according to orders of the action instructions in the sequence of action instructions; with respect to each of the action instructions, determining a failure of the authentication for the liveness face when a face action is determined to be not matched with the action instruction; with respect to each of the action instructions except for the one which has a lowest order in the sequence of action instructions, issuing a next action instruction only when a face action is determined to be matched with the action instruction and there is the next action instruction to be issued; and with respect to the action instruction which has a lowest order in the sequence of action instructions, determining the success of the authentication of the liveness face when a face action is determined to be matched with the action instruction.

As another example, as executed by the computer, the computer program instructions may implement the method for authenticating the liveness face according to the second embodiment of the present disclosure, and performs steps of: issuing an action instruction which has a highest order currently among all un-issued action instructions in the sequence of action instructions, according to orders of the action instructions in the sequence of action instructions; with respect to each of the action instructions, determining a failure of the authentication of the liveness face when no face action is detected within a time period after the action instruction is issued or when a face action is determined to be not matched with the action instruction; with respect to each of the action instructions except for the one which has a lowest order in the sequence of action instructions, a next action instruction is issued only when a face action is detected within the time period after the action instruction is issued and is determined to be matched with the action instruction, while there is the next action instruction to be issued; and with respect to the action instruction which has a lowest order in the sequence of action instructions, determining the success of the authentication of the liveness face when a face action detected within the time period after the action instruction is issued is determined to be matched with the action instruction.

Further, as executed by the computer, the computer program instructions further performs steps of: acquiring face images; calculating a face attribute in the face images; and recognizing the face action according to the calculated face attribute, wherein the face attribute comprises at least one of positions of face key points, face action coefficients and face gesture coefficients.

The respective modules in the apparatus for authenticating the liveness face according to the embodiments of the present disclosure may be implemented by executing the computer program instructions stored on at least one of the storages with at least one of the processors in the system for authenticating the liveness face according to the embodiments of the present disclosure, or may be implemented as the computer program instructions stored on the computer readable storage medium of the computer program product according to the embodiments of the present disclosure are executed by the computer.

The computer readable storage medium may be an arbitrary combination of one or more computer readable storage mediums, for example, one computer readable storage medium includes computer readable program codes for generating the sequence of action instructions randomly, and another computer readable storage medium includes the computer readable program codes for recognizing the face actions.

The computer readable storage medium may comprise, for example, an memory card in the smart phone, a storage part of the tablet computer, a hard disk of the personal computer, a Random Access Memory (RAM), a Read Only Memory (ROM), an Erasable Programmable Read Only Memory (EPROM), a Compact Disc-Read Only Memory (CD-ROM), a USB memory, or any combination thereof.

It may understand that above exemplary embodiments described above in details are only illustrative instead of limitative. Those ordinary skilled in the art should understand, many modifications, combinations and sub-combinations may be made to these embodiments without departing from the principle and spirit of the present disclosure, and such modifications, combinations and sub-combinations should fall into the protection scope of the present disclosure.

What is claimed is:

1. A method for authenticating liveness face, comprising:
generating, by one or more processors, a sequence of action instructions randomly;
determining, by the one or more processors, a success of the authentication of the liveness face when face actions are determined to be matched with the sequence of action instructions sequentially, and
with respect to each action instruction except for one which has a lowest order in the sequence of action instructions, issuing, by the one or more processors, a next action instruction only when a face action is determined to be matched with the action instruction and there is the next action instruction to be issued.

2. The method for authenticating liveness face of claim 1, further comprising:
issuing an action instruction which has a highest order currently among all un-issued action instructions in the sequence of action instructions, according to orders of action instructions in the sequence of action instructions.

3. The method for authenticating liveness face of claim 2, further comprising:
with respect to each of the action instructions, determining a failure of the authentication for the liveness face when a face action is determined to be not matched with the action instruction; and
with respect to the action instruction which has a lowest order in the sequence of action instructions, determining the success of the authentication of the liveness face when a face action is determined to be matched with the action instruction.

4. The method for authenticating liveness face of claim 2, further comprising:
with respect to each of the action instructions, determining a failure of the authentication of the liveness face when no face action is detected within a time period after the action instruction is issued or when a face action is determined to be not matched with the action instruction;
with respect to each of the action instructions except for the one which has a lowest order in the sequence of action instructions, issuing a next action instruction only when a face action is detected within the time period after the action instruction is issued and is determined to be matched with the action instruction, while there is the next action instruction to be issued; and
with respect to the action instruction which has the lowest order in the sequence of action instructions, determining the success of the authentication of the liveness face when a face action detected within the time period after the action instruction is issued is determined to be matched with the action instruction.

5. The method for authenticating liveness face of claim 1, further comprising:
acquiring face images;
calculating a face attribute in the face images; and
recognizing the face action according to the calculated face attribute,
wherein the face attribute comprises at least one of positions of face key points, face action coefficients and face gesture coefficients.

6. The method for authenticating liveness face of claim 1, wherein,
the sequence of action instructions comprises at least one action instruction each being a single action instruction or a sequential action instruction, wherein each sequential action instruction indicates to perform at least two single actions sequentially, each single action is a simple action or a complex action, each single action instruction indicates to perform one single action, each single action instruction is a simple action instruction or a complex action instruction, each simple action instruction indicates to perform one face action, and each complex action instruction indicates to perform at least two face actions simultaneously.

7. The method for authenticating liveness face of claim 6, wherein,
the sequence of action instructions comprises at least two action instructions each being a simple action instruction.

8. The method for authenticating liveness face of claim 6, wherein,
the at least one action instruction is an arbitrary combination of the simple action instruction and the complex action instruction, and at least part of the at least one action instruction is the complex action instruction.

9. The method for authenticating liveness face of claim 6, wherein,
the at least one action instruction is an arbitrary combination of the sequential action instruction and the single action instruction, and at least part of the at least one action instruction is the sequential action instruction.

10. A system for authenticating liveness face, comprising:
one or more processors;
one or more storages;
computer program instructions stored in at least one of the storages, as executed by at least one of the processors, the computer program instructions performing steps of:
generating a sequence of action instructions randomly;
determining a success of authentication of a liveness face when face actions are determined to be matched with the sequence of action instructions sequentially;
with respect to each action instruction except for one which has a lowest order in the sequence of action instructions, issuing a next action instruction only when a face action is determined to be matched with the action instruction and there is the next action instruction to be issued.

11. The system for authenticating liveness face of claim 10, as executed by at least one of the processors, the computer program instructions further performing steps of:
issuing an action instruction which has a highest order currently among all un-issued action instructions in the sequence of action instructions, according to orders of action instructions in the sequence of action instructions;
with respect to each of the action instructions, determining a failure of the authentication for the liveness face when a face action is determined to be not matched with the action instruction; and
with respect to the action instruction which has a lowest order in the sequence of action instructions, determining the success of the authentication of the liveness face when a face action is determined to be matched with the action instruction.

12. The system for authenticating liveness face of claim 10, as executed by at least one of the processors, the computer program instructions further performing steps of:
   issuing an action instruction which has a highest order currently among all un-issued action instructions in the sequence of action instructions, according to orders of action instructions in the sequence of action instructions;
   with respect to each of the action instructions, determining a failure of the authentication of the liveness face when no face action is detected within a time period after the action instruction is issued or when a face action is determined to be not matched with the action instruction;
   with respect to each of the action instructions except for the one which has a lowest order in the sequence of action instructions, issuing a next action instruction only when a face action is detected within the time period after the action instruction is issued and is determined to be matched with the action instruction, while there is the next action instruction to be issued; and
   with respect to the action instruction which has a lowest order in the sequence of action instructions, determining the success of the authentication of the liveness face when a face action detected within the time period after the action instruction is issued is determined to be matched with the action instruction.

13. The system for authenticating liveness face of claim 10, further comprising:
   an image collection device configured to collect face images,
   as executed by at least one of the processors, the computer program instructions further performing steps of:
      acquiring face images;
      calculating a face attribute in the face images; and
      recognizing the face action according to the calculated face attribute,
         wherein the face attribute comprises at least one of positions of face key points, face action coefficients and face gesture coefficients.

14. The system for authenticating liveness face of claim 10, wherein the sequence of action instructions generated as the computer program instructions are executed by at least one of the processors comprises at least one action instruction each being a single action instruction or a sequential action instruction, wherein each sequential action instruction indicates to perform at least two single actions sequentially, each single action is a simple action or a complex action, each single action instruction indicates to perform one single action, each single action instruction is a simple action instruction or a complex action instruction, each simple action instruction indicates to perform one face action, and each complex action instruction indicates to perform at least two face actions simultaneously.

15. The system for authenticating liveness face of claim 14, wherein the sequence of action instructions generated as the computer program instructions are executed by at least one of the processors comprises at least two action instructions each being a simple action instruction.

16. The system for authenticating liveness face of claim 14, wherein the at least one action instruction generated as the computer program instructions are executed by at least one of the processors is an arbitrary combination of the simple action instruction and the complex action instruction, and at least part of the at least one action instruction is the complex action instruction.

17. The system for authenticating liveness face of claim 14, wherein the at least one action instruction generated as the computer program instructions are executed by at least one of the processors is an arbitrary combination of the sequential action instruction and the single action instruction, and at least part of the at least one action instruction is the sequential action instruction.

18. A computer program product comprising a non-transitory computer-readable storage medium on which computer program instructions are stored, as executed by a computer, the computer program instructions performing steps of:
   generating, by one or more processors of the computer, a sequence of action instructions randomly;
   determining, by the one or more processors of the computer, a success of authentication of a liveness face when face actions are determined to be matched with the sequence of action instructions sequentially; and
   with respect to each of the action instructions except for the one which has a lowest order in the sequence of action instructions, issuing, by the one or more processors of the computer, a next action instruction only when a face action is determined to be matched with the action instruction and there is the next action instruction to be issued.

19. The computer program product of claim 18, as executed by the computer, the computer program instructions further performing steps of:
   issuing an action instruction which has a highest order currently among all un-issued action instructions in the sequence of action instructions, according to orders of action instructions in the sequence of action instructions;
   with respect to each of the action instructions, determining a failure of the authentication for the liveness face when a face action is determined to be not matched with the action instruction; and
   with respect to the action instruction which has a lowest order in the sequence of action instructions, determining the success of the authentication of the liveness face when a face action is determined to be matched with the action instruction.

20. The computer program product of claim 18, as executed by the computer, the computer program instructions further performing steps of:
   issuing an action instruction which has a highest order currently among all un-issued action instructions in the sequence of action instructions, according to orders of action instructions in the sequence of action instructions;
   with respect to each of the action instructions, determining a failure of the authentication of the liveness face when no face action is detected within a time period after the action instruction is issued or when a face action is determined to be not matched with the action instruction;
   with respect to each of the action instructions except for the one which has a lowest order in the sequence of action instructions, issuing a next action instruction only when a face action is detected within the time period after the action instruction is issued and is determined to be matched with the action instruction, while there is the next action instruction to be issued; and
   with respect to the action instruction which has a lowest order in the sequence of action instructions, determining the success of the authentication of the liveness face when a face action detected within the time period after the action instruction is issued is determined to be matched with the action instruction.

\* \* \* \* \*